United States Patent
McIntosh

[15] 3,671,838
[45] June 20, 1972

[54] ELECTRIC MOTOR CONTROL DEVICE

[72] Inventor: Harold A. McIntosh, South Pasadena, Calif.

[73] Assignee: Robertshaw Controls Company, Richmond, Va.

[22] Filed: March 11, 1971

[21] Appl. No.: 123,159

Related U.S. Application Data

[62] Division of Ser. No. 805,138, March 7, 1969, Pat. No. 3,577,066.

[52] U.S. Cl. ................................318/471, 318/334, 338/31
[51] Int. Cl. .................................................H02p 3/02
[58] Field of Search ....................318/471, 472, 334; 338/31

[56] References Cited

UNITED STATES PATENTS

| | | | |
|---|---|---|---|
| 2,749,495 | 6/1956 | Walley | 318/471 X |
| 3,057,557 | 10/1962 | Guyton et al. | 318/334 X |
| 3,588,657 | 6/1971 | Rouvre | 318/471 |

*Primary Examiner*—Benjamin Dobeck
*Attorney*—Fulwider, Patton, Rieber, Lee & Utecht

[57] ABSTRACT

A motor control device for controlling the speed of an electric motor and including electrical resistor means formed with a plurality of portions disposed in heat exchange relationship with one another and flexible toward and away from one another to adjust the heat exchange rate therebetween, the electrical resistance of the portions being temperature responsive whereby current therethrough is responsive to the temperature thereof. Adjustment means is provided for moving the portions toward and away from one another to adjust the mutual proximity and consequent heat exchange rate therebetween so the electrical current therethrough can be correspondingly adjusted. Electrical circuit means is provided for connecting such resistance means with the motor circuitry.

10 Claims, 1 Drawing Figure

PATENTED JUN 20 1972
3,671,838
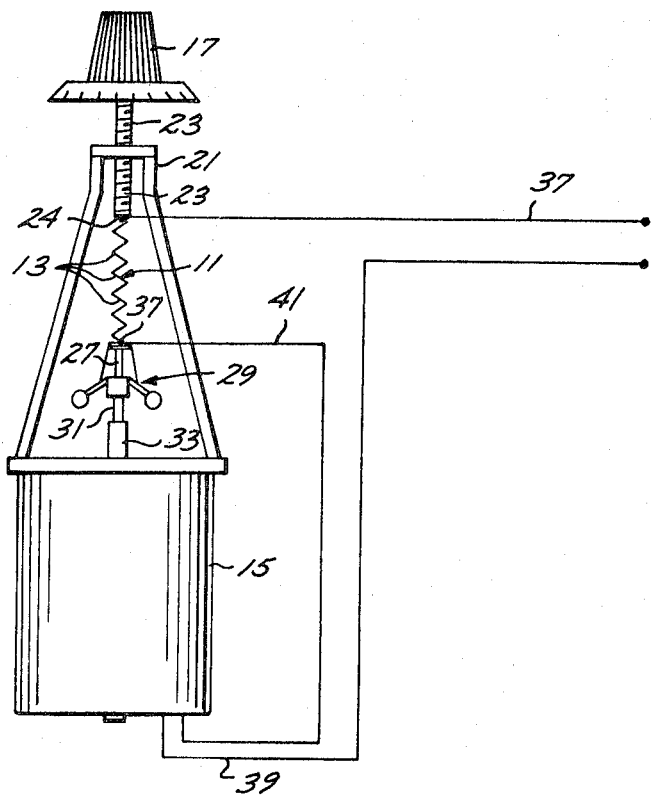
INVENTOR.
HAROLD A. McINTOSH
BY Fulwider, Patton, Rieber,
Lee and Utecht
ATTORNEYS

ELECTRIC MOTOR CONTROL DEVICE

CROSS REFERENCE TO RELATED APPLICATIONS

This application is a divisional application of U.S. Ser. No. 805,138, filed Mar. 7, 1969 now Pat. No. 3,577,066.

BACKGROUND OF THE INVENTION

1. Field of the Invention

The present invention relates to a control device for controlling the current to an electric motor to thereby control the speed thereof.

2. Description of the Prior Art

It has been common practice to utilize potentiometers that include elongated resistors having wiper connected thereto for varying the current to an electric motor to thereby control the speed thereof. Conventional potentiometers of this type suffer the shortcoming that the resistors frequently do not exhibit uniform throughout their length thereby making it difficult to obtain close speed control. Further, many conventional potentiometers will arc or spark when operated thus rendering them unsatisfactory for use in an explosive environment.

SUMMARY OF THE INVENTION

The motor control device of present invention is characterized by an electrical resistor means formed with portions in heat exchange relationship with one another and flexible toward and away from one another to adjust such heat exchange relationship therebetween to thereby alter the temperature of such portions to adjust current flow therethrough. The resistance means is connected with the motor circuitry and adjustment means is provided for adjusting the spacing of the portions of such resistor to adjust the heat exchange rate therebetween.

DESCRIPTION OF THE DRAWING

The single FIGURE in the drawing is a schematic view of a motor control device embodying the present invention.

DESCRIPTION OF THE PREFERRED EMBODIMENT

The motor control device of present invention includes an elongated, flexible variable resistor, generally designated 11, and formed with a plurality of adjacent portions of transversely extending lengths 13 disposed in heat exchange relationship with one another. Such resistor is connected in series with the field of the motor 15 to be controlled and a control knob 17 is provided for adjustment to vary the length of such resistor to thereby adjust the spacing between the portions 13 to adjust the rate of heat exchange therebetween to thereby alter the temperatures thereof to provide a resultant change in the electrical resistance of the resistor 11 to adjust the current flow rate thereto and through the motor 15.

The resistor 11 is made of a material possessing the property of experiencing a relatively high change in electrical resistance in response to a relatively small temperature change. That is, the material is characterized by a high co-efficient of temperature resistance change. Pure nickel exhibits these characteristics as do the materials sold under the trade names "Balcon" and "Hy-Tempco." The resistor 11 may be in the form of a helical coil where the convolutions of wire are in heat exchange relationship with one another. The rate of mutual heat exchange is altered by elongating or shortening the helix to thereby alter the spacing between the adjacent convolutions. Other resistor structures in which portions thereof are formed for location in adjacent heat exchange relationship will suggest themselves to those skilled in the art. All such variations are within the scope of the present invention, it being important only that flexing or deformation of the resistor 11 results in an alteration of the heat exchange relationship of adjacent portions 13 of the resistor 11 to thereby affect the electrical characteristics of such adjacent portions.

The motor 15 is preferably a shaded pole motor and includes a housing having a support frame 21 mounted thereon, such frame being formed with a threaded bore for receipt of the threaded adjustment stud 23 which mounts the knob 17 on the upper end thereof. The stud is made of electrical insulating material and the lower extremity is formed with a spherical socket for receipt of a ball bearing 24 to which the upper extremity of the resistor 11 is attached. Consequently, the stud 23 is free to rotate without rotating the resistor 11. The lower extremity of the resistor 11 is connected with the top end of a plunger 27 included in a centrifugal governor, generally designated 29, which is carried on the drive shaft 31 projecting from a motor housing boss 33.

The upper extremity of the governor plunger 27 terminates in the form of a ball bearing which is rotatably received in a spherically shaped socket formed in a fitting 37 to which the lower end of the resistor 11 is anchored. The fitting 37 is made of electrically insulating material to insulate the resistor 11 from the governor 29. The resistor 11 and field of the motor 15 are connected in series by means of a pair of supply leads 37 and 39 and a lead 41 connecting the lower end of the resistor 11 with one terminal of the motor 15.

In operation electric current is supplied to the power lead 37 and 39 and the control knob 17 is rotated to drive the threaded stud 23 axially inwardly or outwardly in its threaded bore to adjust the spacings between the coils 13 of the helical resistor 11 to set the desired speed for the motor 15. As described hereinabove, adjustment of the knob 17 in one direction to collapse the resistor 11 moves the coils 13 into closer spaced relationship thereby increasing the rate of mutual heat exchange therebetween to heat such coils to a higher temperature. Heating of the coils 13 increases the electrical resistance thereof thereby increasing the resistance to the current through the resistor 11 to the motor 15 thereby decreasing current to such motor and decreasing the speed thereof. Rotation of the control knob 17 in the opposite direction expands the resistor 11 to space the coils 13 farther apart thereby reducing the rate of heat exchange therebetween and enabling such coils to reduce the electrical resistance thereof to thereby increase the current flow to the motor 15.

As the motor drive shaft 31 rotates the governor 29 will be rotated to drive the plunger 27 upwardly to partially collapse the resistor 11 thereby moving the coils 13 into closer spaced relationship to increase the rate of mutual heat exchange therebetween. Such increase in heat exchange rate increases mutual heating of the coils 13 to thereby raise the temperature of the resistor 11 to increase the resistance thereof until the current flow through the leads 37 and 41 is reduced to the set level for the particular setting of the control knob 17. If the speed of the motor 15 is reduced by a decrease in current thereto, as for example by a decrease in a supply of voltage, the rotation of the governor 29 will be slowed and the plunger 27 will be retracted to slightly expand the resistor 11 to space the coils 13 farther apart thereby reducing the rate of mutual heat exchange therebetween to reduce the overall temperature of such resistor and thereby reduce the resistance thereof. Such reduction and resistance will increase the current to the motor 17 to thereby increase the speed thereof and consequently increase the speed of rotation of the governor 29 until the set speed is reached.

From the foregoing it will be apparent that the motor control device of present invention provides an economical and convenient means for controlling the speed of an electric motor which enables the speed to be adjusted and also provides for governing of such speed.

Various modifications and changes may be made with regard to the foregoing detailed description without departing from the spirit of the invention.

I claim:

1. A motor control device comprising:
   an electric motor;
   electrical resistor means formed with portions disposed in heat exchange relationship with one another and flexible toward and away from one another to adjust the rate of mutual heat exchange between said portions, the electrical resistance of said portions being temperature responsive so current flow therethrough is responsive to the temperature thereof;

adjustment means for moving said portions toward and away from one another to adjust the mutual proximity thereof and consequent heat exchange rate therebetween so the electrical current passing therethrough is correspondingly adjusted; and electrical circuit means connecting said electrical resistor means in circuit with said motor whereby adjustment of said adjustment means will vary the current to said motor to alter the speed thereof.

2. A motor control device as set forth in claim 1 wherein:
said adjustment means includes a frame mounting one extremity of said resistance means and formed with an internally threaded bore, said adjustment means further including an externally threaded shaft screwed into said bore and connected on one end with the extremity of said resistance means opposite said one extremity.

3. A motor control device as set forth in claim 1 that includes:
governor means coupled with the drive shaft of said motor and responsive to variations in the speed of said motor to adjust the spaced relationship of said portions.

4. A motor control device as set forth in Claim 1 wherein:
said adjustment means includes a frame, first electrical insulating means connecting one end of said resistance means with said frame, a movable element carried movably from said frame and second electrical insulating means connecting the end of said resistance opposite said one end to said movable element.

5. A motor control device as set forth in claim 2 that includes:
said adjustment means including a pivot means interposed between said shaft and said opposite end of said resistance means.

6. A motor control device as set forth in claim 1 wherein:
said motor is a shaded pole motor; and
said circuit means connects said resistance with the field of said motor.

7. A motor control device as set forth in claim 1 wherein:
said adjustment means includes a frame mounting said resistance means and electrical insulating means insulating said resistance means from said frame.

8. A motor control device as set forth in claim 1 wherein:
said resistance means is in the form of a coiled resistance lead having the individual coils thereof defining said portions.

9. A motor control device as set forth in claim 1 wherein:
said motor is in the form of an electrical motor; and
said circuit means connects said resistance means in series with the field of said motor.

10. A motor control device as set forth in claim 2 that includes:
governor means mounted on said frame and connected with said drive shaft of said motor and the opposite end of said resistance means, said governor means being responsive to variations in one direction of the speed of said motor to adjust the spacing between said portions to adjust the speed of said motor in the direction opposite said one direction.

* * * * *